Aug. 30, 1932.    F. M. HARTFORD    1,874,516
APPARATUS FOR TREATING CERAMIC WARE
Filed April 10, 1930    4 Sheets-Sheet 2

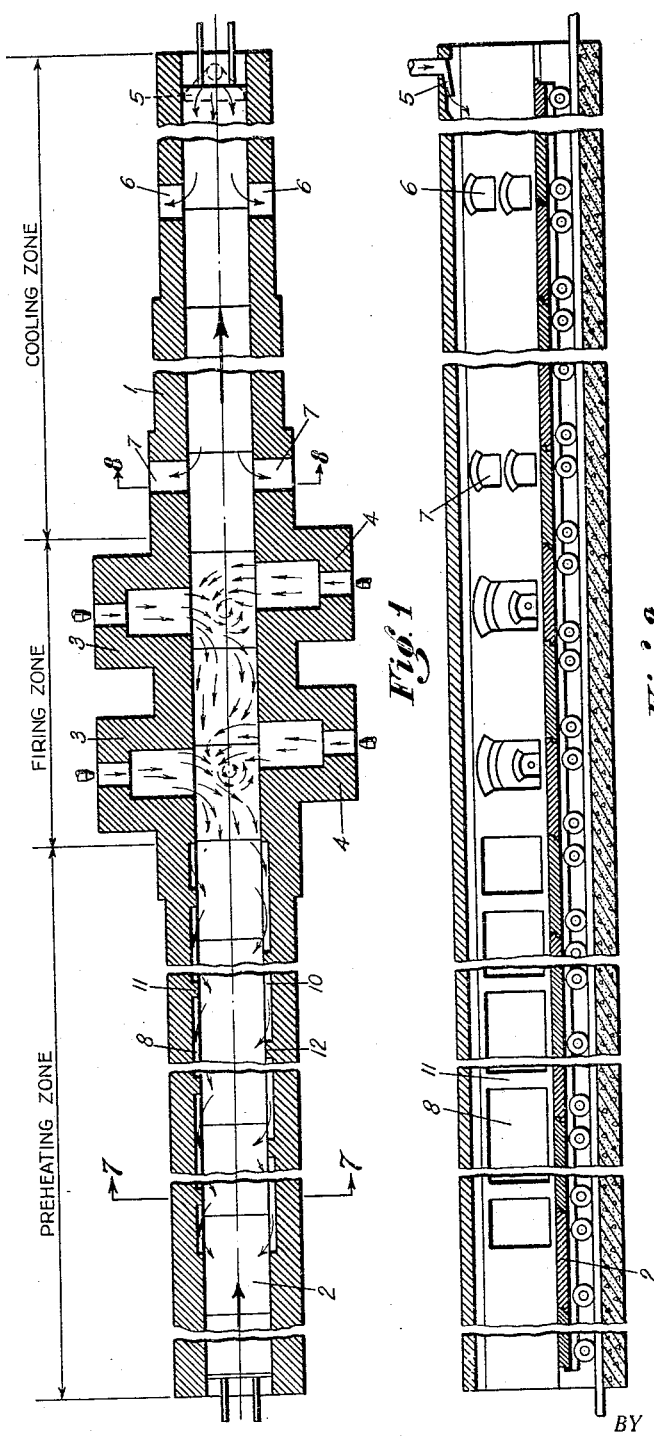

INVENTOR.
Frank M. Hartford.
BY
ATTORNEY.

Aug. 30, 1932.   F. M. HARTFORD   1,874,516
APPARATUS FOR TREATING CERAMIC WARE
Filed April 10, 1930   4 Sheets-Sheet 3

INVENTOR.
Frank M. Hartford.
BY
ATTORNEY

Aug. 30, 1932.     F. M. HARTFORD     1,874,516
APPARATUS FOR TREATING CERAMIC WARE
Filed April 10, 1930     4 Sheets-Sheet 4

INVENTOR.
Frank M. Hartford.
BY
ATTORNEY.

Patented Aug. 30, 1932

1,874,516

UNITED STATES PATENT OFFICE

FRANK M. HARTFORD, OF COLUMBUS, OHIO, ASSIGNOR TO THE HARROP CERAMIC SERVICE COMPANY, OF COLUMBUS, OHIO, A CORPORATION OF OHIO

APPARATUS FOR TREATING CERAMIC WARE

Application filed April 10, 1930. Serial No. 443,088.

My invention relates to method and apparatus for treating ceramic ware. It has to do particularly with those types of apparatus wherein clay ware is conducted through a tunnel by means of conveying units. It is particularly applicable in connection with tunnel kilns wherein the ware to be treated is conveyed first through a preheating zone, then through a firing zone and then through a cooling zone. However, certain aspects of my invention may be applicable to ovens, dryers and devices of a similar nature, while it will be obvious that my invention is not necessarily limited to the treatment of clay ware.

One of the objects of my invention, when applied to the treatment of clay ware in tunnel kilns, is to provide for the subjection of the clay ware to a cooling medium after it has passed the firing zone in such a way that this cooling medium will not materially detract from the effectiveness of the burning gases in the firing of the ware.

Another object of my invention is to provide such a method and apparatus for subjecting the ware to a cooling medium that the cooling of the ware may be effected with a comparative suddenness immediately after the ware leaves the firing zone while, at the same time, the burning gases in the firing zone will be adequately protected from an admixture of an excessive volume of this cooling medium so that they may produce vitrification of the ware with undiminished effectiveness.

Another object of my invention is to provide such a method and apparatus for delivering the heat-treating gases to the center of the ware setting, particularly in the preheating zone, in such a way that the ware will be more uniformly treated. Stated another way, one of my objects is to adequately deflect the heating gases from the sides of the kiln so that there will result a greater circulation of heating gases in the center of the ware setting than it has, hitherto, been possible to obtain.

Another object of my invention is to provide a method and apparatus for controlling the application of heated gases to the ware setting in the firing zone in such a way as to produce a more uniform application of the treating gases therein, with a consequent avoidance of occasional cold spots or areas.

Another object of my invention consists in the provision of a novel type of refractory top for cars or other conveying units, this top being of such a form that expansion of the component units thereof may occur without materially increasing the total area thereof and that this condition will be maintained throughout operation.

In the preferred embodiment of my invention, I have provided a kiln of the tunnel type wherein the ware, after it emerges from the firing zone, is subjected to a cooling medium directly applied for lowering the temperature thereof. This cooling medium is introduced into the cooling zone and travels toward the firing zone in direct contact with the ware. Before reaching the firing zone, however, a selected proportion of this cooling medium is allowed to escape from the tunnel, so that the firing zone will be adequately protected from an admixture of an excessive volume of this cooling medium with a consequent dilution of the gases in the firing zone and decrease in the efficiency of the firing action. This cooling medium is preferably introduced into the tunnel adjacent the ware delivery end of the kiln and a portion thereof allowed to escape after it has traveled for a distance toward the firing zone. However, an important aspect of this invention arises from the fact that a sufficient amount of the cooling medium is conducted to points immediately adjacent the firing zone to ensure that the main drop in the temperature of the ware is caused to occur immediately after the ware leaves the firing zone while, as pointed out, the firing gases are protected from dilution by allowing the proper quantity of cooling medium to escape at this point after it has done its work and before it enters the firing zone.

In my preferred form of kiln, also, the walls of the kiln in the preheating zone are provided with panels set back in the wall or cutaway portions which are preferably staggered. These inset panels give greater freedom of travel for the heating gases in the areas where the panels are located but these panels are separated by areas of normal tunnel widths or pilasters which serve to deflect the heating gases as they pass from each panel, in such a way that these gases are deflected toward the center of the ware setting. The panels along one wall of the kiln are preferably disposed in staggered relation to the panels in the opposite walls of the kiln, so that the heating gases are caused to follow a continuous tortuous path in a substantially horizontal plane, moving toward the charging end of the kiln and, at the same time, weaving through the ware setting first toward one side of the kiln and then toward the other.

Likewise, in my preferred form of kiln, the furnaces of the firing zone are disposed in a series on opposite sides of the kiln, in such a manner that the units of a series on one side bear a staggered relation to the units in series on the other side of the kiln. This obviates a tendency present in the use of directly opposing furnace units, toward the production of a static pressure in the center of the ware setting, offering a resistance to lateral travel of the gases therethrough. It is also important to note that, while the furnace units on one side of my kiln are disposed in staggered relation to the furnace units on the other side of my kiln, they are not in uniformly staggered relation but are preferably more or less overlapping, so that there is produced a vortex or whirling body of hot gases in the center of the ware setting, resulting in a concentration of heat at that point and with a consequent obviation of cold spots which are likely to occur, otherwise.

The preferred embodiment of my invention also comprises a kiln car with a refractory top which is made up of independent blocks that are slightly separated on all sides to permit free expansion of the independent blocks both upon the individual car or transporting unit and between adjacent cars. These independent blocks bear a partial overlapping relation to each other that may be described as a modified "ship-lap" construction. The openings between the blocks are comparatively narrow adjacent the upper sides of the blocks and are somewhat widened toward the bottom so as to preclude the filling up of the joints, with a consequent destruction of the freely expansive relation between the blocks, by permitting any extraneous matter which enters these joints to drop to the bottom thereof where it may be readily removed.

The preferred embodiment of my invention is shown in the accompanying drawings wherein similar characters of reference designate corresponding parts and wherein:

Figure 1 is a horizontal longitudinal section taken through a kiln embodying my invention.

Figure 2 is a vertical longitudinal section of the structure shown in Figure 1.

Figure 3:
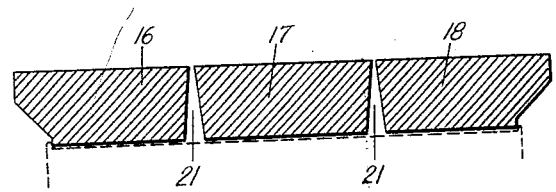
Figure 3 is a transverse section taken through the refractory top of my car or other transporting unit.

My invention is shown in the drawings as applied to a kiln 1 wherein the ware to be treated is carried upon a train of cars or other transporting units 2. As indicated by the heavy black arrows in Figure 1, these cars with the settings of ware thereon first traverse a preheating zone. They pass from this preheating zone into the firing zone. Then, from the firing zone, they pass into and through the cooling zone.

The kiln 1 is equipped with furnaces 3 and 4. Any number of these furnace units may be used and it will be noted that the units 3 of the series upon one side of the kiln are disposed in staggered relation to the units 4 on the other side of the kiln. Furthermore, it will be seen that the furnace units 4 are not located midway between the furnace units 3 but are preferably arranged in overlapping staggered relation thereto. It is not absolutely essential that they be disposed in such overlapping relation. However, it is desirable that these units be disposed in such staggered relation, that the burning gases from the furnaces in opposing walls of the firing zone will not directly combat each other and produce a static condition at the center of the line of passage of the ware but will, by frictional off-center contact, produce a whirling vortex of flame or heated gases for each pair of opposing furnaces in the center of the ware setting as it passes through the firing zone with a consequent subjection of the passing ware to a concentration of heat at the center thereof.

Adjacent the outer extremity of the cooling zone, my kiln is preferably provided with a flared pipe 5 disposed in the roof of the kiln for delivering cooling air into the cooling zone and directing it toward the firing zone. At a distance beyond the place at which the cooling air is delivered into the cooling zone and, preferably, midway of the cooling zone, relief ports 6 are provided which are sufficient to permit escape of a selected proportion of the cooling air. The main relief ports, however, are located in a portion of the cooling zone which is immediately adjacent the firing zone.

The preheating zone has its vertical walls provided with inset panels or cutaway portions 8 and 10. These inset panels are separated by pilasters or portions 11 and 12, whose opposing surfaces are in alignment with the inner vertical faces of the kiln walls throughout the rest of the kiln and which, therefore, are designed to project considerably closer to the ware setting than the inset panels. The inset panels 8 are in staggered relation to the inset panels 10 in the opposing walls of the kiln, to ensure unusual turbulence of the preheating gases and avoidance of cold spots.

As shown in Figures 3, 4, 5 and 6, I preferably use a car 2 mounted upon wheels 14 which are designed to travel upon tracks 15. Each car or other transporting element is preferably provided with a refractory top comprising independent refractory blocks 16, 17 and 18. The blocks 16 and 18 which constitute the side blocks of the refractory top of the car preferably have their exterior edges shaped to fit cutaway portions 19 and 20 in the walls of the kiln.

As shown in Figure 3, the longitudinal joints 21 between the blocks are open at their tops but are of comparatively slight width. These joints 21 become wider as they approach the bases of the refractory blocks.

Figure 4:
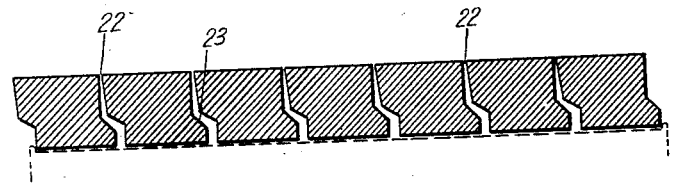
Figure 4 is a longitudinal section taken through this refractory top.

The transverse joints between the blocks of a car top may be designated 22 and are shown best in Figure 4. These joints 22 are comparatively narrow at their tops and preferably take the form of what is frequently known as modified "ship-lap" joints with inclined portions 23. These inclined portions 23 of the joints 22 are somewhat wider than the upper portions of the joints 22 and the lower portions of the joints become still wider as they approach the bases of the blocks.

Figure 5:
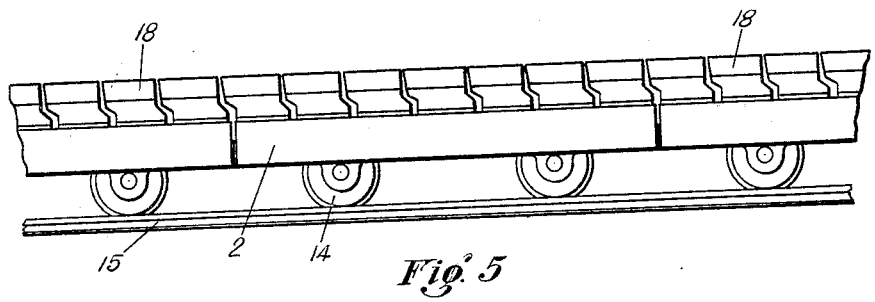
Figure 5 is a side elevation of a series of cars equipped with my novel refractory top and showing the relation between the blocks of adjacent cars, as well as the relation between the independent blocks of each car.
Figure 6:
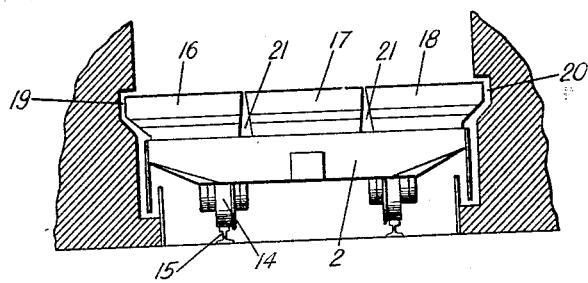
Figure 6 is a transverse section taken through the kiln and showing one of my cars mounted therein.
Figure 7:
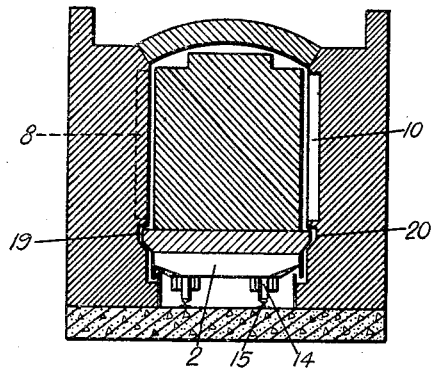
Figure 7 is a transverse section taken on the line 7—7 of Figure 1.
Figure 8:
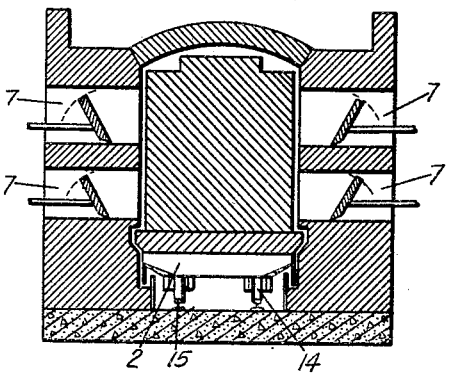
Figure 8 is a transverse section taken on line 8—8 of Figure 1.

By referring to Figure 5, it will be seen that the end blocks of each car bear the same relation to the end blocks of the adjacent car as do the several blocks on each car. That is, they are separated by modified "ship-lap" joints.

With this construction of refractory tops for my cars, the separate blocks are free to expand individually without enlarging the car top. Furthermore, this condition will be maintained because of the construction of the joints between adjacent blocks which ensures that any chips, clay fragments or other débris that may enter the joints between these blocks will pass on down through to the bottom of the joints, whence they may then be removed from time to time without difficulty.

In the operation of my invention, the ware enters the kiln and passes through the preheating zone, the firing zone and then the cooling zone. The flames from the furnaces are projected into the tunnel of the kiln from opposite sides as indicated by the arrow in the firing zone (Figure 1). The staggered relation of the furnace units, as previously described, results in an off-center contact of the opposing gas currents and this sets up a vortex of whirling flame and hot gases for each pair of opposing furnaces which tends to concentrate the heat in the center of the setting. This will result in a much more uniform burning of the ware both at the sides and in the center of the ware setting.

The burning gases and the products of combustion, together with the balance of the cooling medium, being subjected to the normal suction means preferably located adjacent the entrance end of the kiln, will gradually move through the firing zone and, thence, into the preheating zone. As these gases enter the preheating zone, they spread out into the spaces produced by the inset panels and as they leave each inset panel they are deflected toward the center of the ware setting, as indicated by the arrows in the preheating zone. Owing to the staggered relation of these inset panels and of the pilasters which separate the successive panels, these gases, while moving steadily toward the ware entrance end of the kiln, move in a tortuous, substantially horizontal path and weave from side to side through the ware setting until they finally reach the point or points at which they are removed from the kiln. Thus, the ware entering the preheating zone passes through this zone and is thoroughly and effectively heated by the combustion gases which are moving in an opposite direction but in a horizontally tortuous path through the setting. Then, this preheated ware reaches the firing zone and passes therethrough under subjection to the whirling gases and flames therein.

The ware then passes on into the cooling zone and is subjected to the cooling medium which has been introduced through the port 5. The cooling action of this cooling medium becomes effective upon the ware immediately after it leaves the firing zone, owing to the fact that most of this cooling medium is permitted to travel practically up to the firing zone before the excessive portion of such medium is allowed to escape. It will, however, be noted that a portion of this medium is permitted to escape through the relief ports 6 and the remainder through the relief ports 7.

This ensures a most efficient cooling and, at the same time, precludes such dilution of the gases in the firing zone as would decrease the efficiency thereof.

Figure 11:
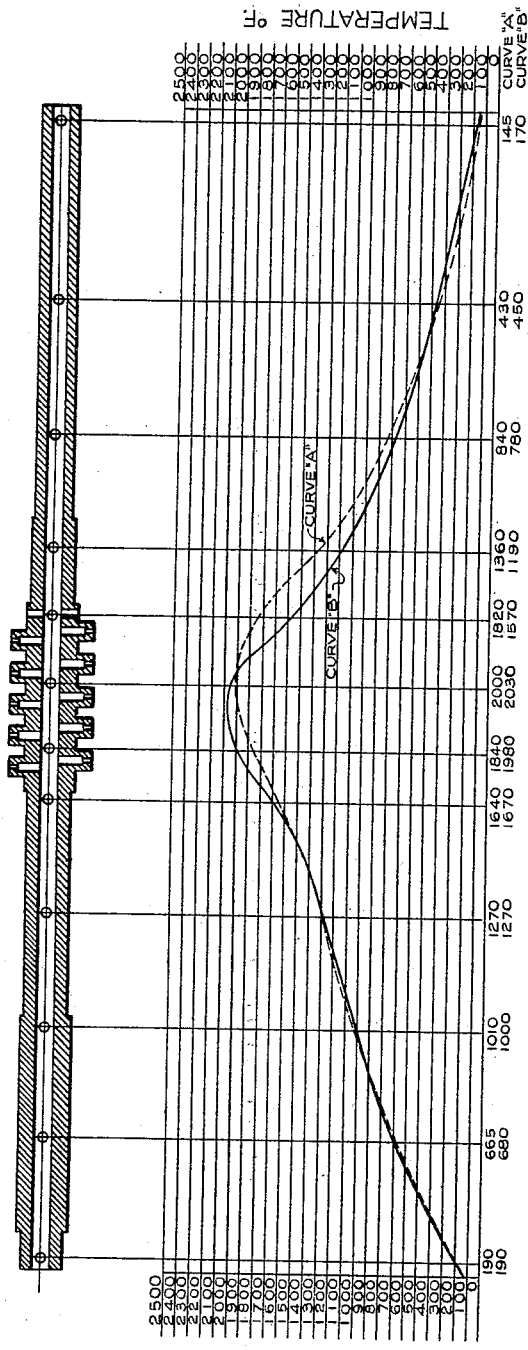
Figure 11 is a diagram constituting a temperature record which illustrates the manner in which the temperature within a kiln may be caused to drop suddenly immediately beyond the firing zone by the disposition of relief ports for removing the cooling air just before it reaches this firing zone.

Figure 11 has been introduced into this case to illustrate the importance of that phase of my invention which involves conducting a relatively large volume of the cooling medium to points in close proximity to the firing zone. This figure shows an actual temperature record of a tunnel kiln and illustrates two different temperature curves. The temperature curve shown in full line and designated B illustrates the sudden dropping of the temperature in the kiln immediately adjacent the firing zone and the more gradual cooling action adjacent that end of the kiln from which the ware ultimately emerges, this sudden dropping at this early stage of the operation being due to the fact that relief ports for the removal of the excess of the cooling medium are located close to the firing zone, as shown in Figure 1 of the drawings. The temperature curve shown in dotted line and designated A illustrates the more gradual dropping of the temperature in the kiln immediately adjacent the firing zone and the more rapid cooling adjacent the end of the kiln from which the ware ultimately emerges, this more gradual dropping of the temperature being due to the fact that the relief ports for the final removal of the excess of the cooling medium were located at more remote points from the firing zone and nearer to the point of introduction of the cooling medium into the kiln.

Figure 9:
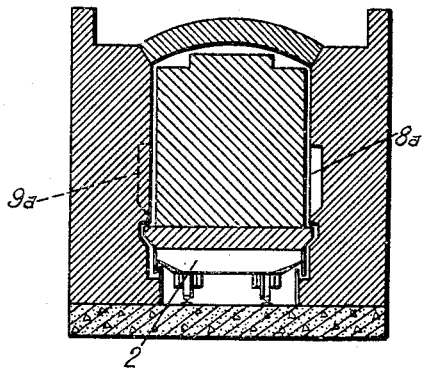
Figure 9 is a transverse sectional view of a kiln showing a modification of my invention.
Figure 10:
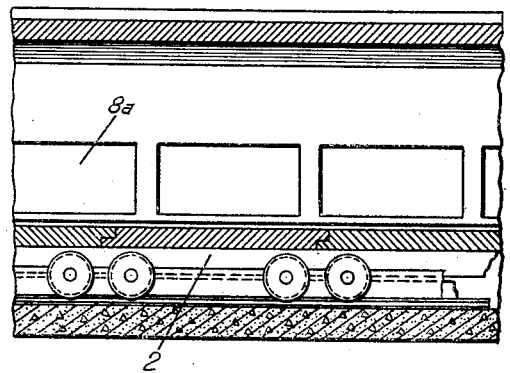
Figure 10 is a longitudinal vertical section of the structure shown in Figure 9.

In the modification of my invention, illustrated in Figures 9 and 10, the inset panels 8ª and 9ª, which are provided in the preheating zone, have their lower edges located immediately above the level of the car top but have their upper edges located part way up the height of the ware setting. With this construction, the heating gases are not only caused to weave back and forth through the ware in a substantially horizontal plane, as in the form previously described, but the tendency of these gases toward concentration in the upper half of the tunnel is materially checked by the small space between the side walls of the tunnel above the inset panels and the sides of the ware setting. Thus, the heating gases will more uniformly heat the ware than has been possible previously, since the natural tendency of the gases to rise to the top of the tunnel is materially neutralized.

It will be understood that, though this invention has been described more particularly in connection with kilns, various phases of it are applicable to such devices as dryers, ovens, furnaces, et cetera. It will also be understood that the showings of the various figures have omitted many of the valves and similar devices which might be desirable in the operation of my method and apparatus, this omission being for the purpose of simplifying the description of the invention. It will, likewise, be understood that this invention is not necessarily limited to the treatment of clay ware, even though the description and claims may refer only to clay ware.

Having thus described my invention, what I claim is:

1. Apparatus for treating articles comprising a firing zone, a cooling zone, means for introducing a cooling medium into said cooling zone and flowing it towards said firing zone in direct contact with the articles, means immediately adjacent said firing zone for permitting escape of a portion of said cooling medium, and means intermediate said last-named means and the point of introduction of said cooling medium for permitting a portion of said cooling medium to escape, the means for introducing and the means for permitting escape being such that a volume of cooling medium in excess of that required for firing may be introduced for cooling and the excess removed before it reaches the firing zone.

2. Apparatus for treating articles comprising a firing zone, opposing ports for inducing burning gases into said zone, said ports being disposed in irregularly staggered relation, a cooling zone in communication with said firing zone, means for introducing a cooling medium into said cooling zone and flowing it toward said firing zone in direct contact with the articles, means immediately adjacent said firing zone for permitting escape of a portion of said cooling medium, and means intermediate said last named means and the point of introduction of said cooling medium for permitting a portion of said cooling medium to escape, the means for introducing and the means for permitting escape being such that a volume of cooling medium in excess of that required for firing may be introduced for cooling and the excess removed before it reaches the firing zone.

3. Apparatus for treating articles comprising a firing zone, opposing ports for introducing burning gases into said zone, said ports being disposed in irregularly staggered relation, a cooling zone in communication with said firing zone, means for introducing a cooling medium into said cooling zone and flowing it toward said firing zone in direct contact with the articles, means immediately adjacent said firing zone for permitting escape of a portion of said cooling medium, means intermediate said last named means and the point of introduction of said cooling medium for permitting a portion of said cooling medium to escape, the means for introducing and the means for permitting escape being such that a volume of cooling medium in excess of that required for firing may be introduced for cooling and the excess removed before it reaches the firing zone, a preheating zone in communication with said firing zone, and means for causing the passage of the products of combustion from said firing zone through said preheating zone.

4. Apparatus for treating articles comprising a firing zone, opposing ports for introducing burning gases into said zone, said ports being disposed in irregularly staggered relation, a preheating zone in communication with said firing zone, and means for causing the passage of the products of combustion from said firing zone through said preheating zone.

5. Appaartus for treating articles comprising a firing zone, opposing ports for introducing burning gases into said zone, said ports being disposed in irregularly staggered and over-lapping relation to each other, a cooling zone in communication with said firing zone, means for introducing a cooling medium into said cooling zone and flowing it toward said firing zone in direct contact with the articles, means immediately adjacent said firing zone for permitting escape of a portion of said cooling medium, and means intermediate said last named means and the point of introduction of said cooling medium for permitting a portion of said cooling medium to escape, the means for introducing and the means for permitting escape being such that a volume of cooling medium in excess of that required for firing may be introduced for cooling and the excess removed before it reaches the firing zone.

6. Apparatus for treating articles comprising a firing zone, opposing ports for introducing burning gases into said zone, said ports being disposed in irregularly staggered and over-lapping relation to each other, a preheating zone in communication with said firing zone, and means for causing the passage of the products of combustion from said firing zone through said preheating zone in a horizontal tortuous path.

7. Apparatus for treating articles comprising a firing zone, opposing ports for introducing burning gases into said firing zone from opposite sides thereof, said opposing ports being disposed in irregularly staggered relation.

8. Apparatus for treating articles comprising a firing zone, opposing ports for introducing burning gases into said firing zone from opposite sides thereof, said opposing ports being disposed in overlapping relation to each other.

9. Apparatus for treating articles, comprising a preheating zone having a side and top walls designed to closely approach the ware settings, conveying means supporting ware settings through said preheating zone, said conveying means having no vertical end walls, and inset panels disposed at intervals in said side walls to effect intermittent crowding of the heating gases laterally into the ware settings.

10. Apparatus for treating articles, comprising a preheating zone having its side and top walls designed to closely approach the ware settings, conveying means supporting ware settings through said preheating zone, said conveying means having no vertical end walls, and inset panels disposed at intervals in said side walls to effect intermittent crowding of the heating gases laterally into the ware settings, the inset panels of the opposing walls being disposed in staggered relation to each other.

11. Apparatus for treating articles comprising a preheating zone, a firing zone, a cooling zone, a series of cars designed to operate in said zones, and refractory tops for said cars embodying a plurality of independent blocks with open joints between such blocks which increase in width from top to bottom.

12. Apparatus for treating articles comprising a preheating zone, a firing zone, a cooling zone, a series of cars designed to operate in said zones, and refractory tops for said cars embodying a plurality of independent blocks, such blocks being separated by modified shiplap joints which widen toward their bottoms.

In testimony whereof I hereby affix my signature.

FRANK M. HARTFORD.